(12) United States Patent
Ura et al.

(10) Patent No.: US 6,228,975 B1
(45) Date of Patent: May 8, 2001

(54) POLYALKYLENE NAPHTHALATE, COMPOSITION THEREOF, FILM, AND PROCESSES FOR PRODUCING THESE

(75) Inventors: Tomokatsu Ura; Masahiko Kosuge, both of Matsuyama; Hideshi Kurihara, Osaka, all of (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/445,347

(22) PCT Filed: Apr. 7, 1999

(86) PCT No.: PCT/JP99/01846

§ 371 Date: Dec. 8, 1999

§ 102(e) Date: Dec. 8, 1999

(87) PCT Pub. No.: WO99/52963

PCT Pub. Date: Oct. 21, 1999

(30) Foreign Application Priority Data

Apr. 10, 1998 (JP) .................................. 10-099610
May 7, 1998 (JP) .................................. 10-124831

(51) Int. Cl.$^7$ ...................... C08G 63/189; C08G 63/85; C08G 63/87
(52) U.S. Cl. ...................... 528/285; 524/783; 524/786; 524/789; 528/275; 528/286; 528/287; 528/293; 528/295; 528/308; 428/328; 428/329; 428/330; 428/331; 428/480; 428/694.52; 428/910
(58) Field of Search ...................... 524/783, 786, 524/789; 528/308, 275, 285, 286, 287, 293, 295; 428/328, 329, 330, 331, 480, 694 SL, 910

(56) References Cited

U.S. PATENT DOCUMENTS 5,188,774 * 2/1993 Nitta et al. ............................ 528/275
6,042,773 * 3/2000 Teramoto et al. .................... 528/275

FOREIGN PATENT DOCUMENTS

| WO 90/08171 | 7/1990 | (JP) . |
| 7-82464 | 3/1995 | (JP) . |
| 8-53541 | 2/1996 | (JP) . |
| 8-104744 | 4/1996 | (JP) . |
| 10-219095 | 8/1998 | (JP) . |
| 11-5834 | 1/1999 | (JP) . |
| 90/08171 | 7/1990 | (WO) . |

OTHER PUBLICATIONS

Patent Abstracts of Japan, Mar. 19, 1996, Publication No.: 08073571.
Chemical Abstracts, 38–Plastics Fabrication and Uses, vol. 125, Nov. 12, 1996, p. 110.
Chemical Abstracts, 35–Chemistry of Synthetic High Polymers, vol. 125, Nov. 16, 1998, p. 27.
Chemical Abstracts, 37–Plastics Manufacture and Processing, vol. 125, Nov. 20, 1996, p. 85.
Chemical Abstracts, 35–Chemistry of Synthetic High Polymers, vol. 125, Nov. 4, 1996, p. 19.
Chemical Abstracts, 35–Chemistry of Synthetic High Polymers, vol. 125, Nov. 10, 1996, p. 24.
International Search Report.

* cited by examiner

*Primary Examiner*—Peter Szekely
(74) *Attorney, Agent, or Firm*—Sughrue, Mion, Zinn, Macpeak & Seas, PLLC

(57) ABSTRACT

A polyalkylene naphthalate for a film, which comprises a naphthalenedicarboxylic acid component as a main dicarboxylic acid component and an aliphatic glycol component as a main glycol component, and contains (a) an antimony compound and (b) a quaternary phosphonium sulfonate compound unit having an ester-forming functional group in such amounts that satisfy the following expressions (1) and (2):

$$0 < Sb \leq 80 \quad (1)$$

$$0 < S/Sb \leq 0.4 \quad (2)$$

wherein Sb and S are the molar ratios (mmol %) of the antimony compound and the quaternary phosphonium sulfonate compound unit having an ester-forming functional group to the total of all the dicarboxylic acid components forming the polyalkylene naphthalate, respectively.

The film of the present invention has excellent surface flatness and is suitable for use as a base film for a magnetic recording medium. It is also excellent in high-speed winding properties and can be formed into a film stably and produced industrially advantageously.

28 Claims, No Drawings

POLYALKYLENE NAPHTHALATE, COMPOSITION THEREOF, FILM, AND PROCESSES FOR PRODUCING THESE

FIELD OF THE INVENTION

The present invention relates to a polyalkylene naphthalate, a composition and a film thereof, and production processes therefor. More specifically, it relates to a polyalkylene naphthalate containing an antimony compound and a specific quaternary phosphonium sulfonate compound in specific amounts, a film formed therefrom, and production processes therefor.

PRIOR ART

Of polyalkylene naphthalates comprising naphthalenedicarboxylic acid as a main dicarboxylic acid component and an aliphatic glycol as a main glycol component, polyethylene naphthalate is widely used in fibers, films, resins and the like due to its excellent physical and chemical properties. Of these, a polyethylene naphthalate film is used as a base film for a photo film and a magnetic tape, which reconciles cost and properties such as strength, heat resistance and chemical resistance.

The polyethylene naphthalate film is produced by the same method as that for a polyester film such as a polyethylene terephthalate film.

Polyester films are generally produced by quenching a film-form polyester melt extruded from an extrusion nozzle on the surface of a rotary cooling drum and stretching it in both longitudinal and transverse directions. To eliminate the surface defects of a film and improve thickness uniformity thereof, adhesion between the melt extruded film-form polyester and the surface of the rotary cooling drum must be improved. As means of improving the adhesion, there is known a method in which a wire metal electrode (to be referred to as "electrostatic wire" hereinafter) is provided between an extrusion nozzle and the surface of a rotary cooling drum to deposit static charge on the surface of a film-form melt (to be referred to as electrostatic casting method hereinafter).

Reducing production cost by increasing productivity in the formation of a film is as important a theme as improving the quality of a film. To this end, the improvement of film-forming speed by increasing the rotating speed of the rotary cooing drum is the most effective. However, when the rotating speed of the rotary cooling drum is increased in the above electrostatic casting method, the amount of unit area static charge on the surface of the film-form product decreases and adhesion between the rotary cooling drum and the film-form product lowers, thereby producing surface defects on the surface of the film or making film thickness non-uniform. To enhance this adhesion, there can be employed means of increasing the amount of static charge on the molten polyester by raising voltage to be applied to the electrode. If application voltage is raised excessively, arc discharge may occur between the electrode and the rotary cooling drum, the film-form product on the cooling drum may be broken, and the surface of the cooling drum may be damaged. Therefore, it is substantially impossible to increase voltage to be applied to the electrode to a level higher than a predetermined level.

To overcome the limitation of this electrostatic casting method and produce a polyester film efficiently by increasing a film-forming speed, there are proposed various methods of reducing the resistivity of a molten polyester.

The methods include, for example, one (JP-B 7-5765) in which a molten polyester film having an AC volume resistivity of $6.5 \times 10^8$ Ωcm or less and containing in the polymer chain 0.1 to 45 mmol % of a quaternary phosphonium sulfonate having an ester-forming functional group based on a dicarboxylic acid component forming the polyester is used.

A catalyst is generally used for the production of a polyester. Particularly, an antimony compound is widely used because it has high polymerization speed and is excellent in various properties such as the thermal stability of the obtained polyester, the amount of a terminal carboxyl group and softening point. However, it is known that the antimony compound is often deposited in the production processes of a polymer and a film and the deposited particles form small protrusions on the surface of a film (JP-A 8-53541).

JP-A 8-104744 discloses a method of obtaining a film having excellent surface flatness by suppressing the formation of fine irregularities on the surface of the film caused by the deposition of a catalyst component such as an antimony compound and a film having excellent electrostatic adhesion at the time of film formation in the production of a polyethylene naphthalate film. In the method, a calcium compound, magnesium compound, phosphorus compound and antimony compound are added to polyethylene naphthalate in specific amounts and a specific ratio.

However, it has been found that it is difficult to fully prevent the formation of fine protrusions caused by the deposition of a catalyst component and troubles caused thereby, even by means of technologies for selecting one from the above proposed catalyst components and optimizing the amount of the catalyst component.

Especially in a film for a high-density magnetic recording medium typified by a metal-deposited video tape which requires surface flatness and uniformity, the existence of fine protrusions on the surface of the film causes an error disadvantageously.

It has also been found that when film formation speed is increased to improve productivity at the time of the formation of a polyalkylene naphthalate film, the deposition of an antimony compound used as a catalyst exerts an influence upon the maximum winding speed at the time of film formation.

Further, it has been found that the deposition of the antimony compound is also connected with film formation stability at the time of film formation.

That is, it has been discovered that the maximum winding speed can be increased and a homogeneous film can be produced stably and industrially advantageously by suppressing the formation of coarse particles caused by the deposition of the antimony compound and by controlling the size and number of the coarse particles if they are formed.

Problem To Be Solved by the Invention

The inventors of the present invention have found that, when a quaternary phosphonium sulfonate having an ester-forming functional group is added to produce a polyalkylene naphthalate film in the presence of an antimony compound as a catalyst, the number of finely deposited particles considered as reduced antimony in the film increases in proportion to the concentration of the quaternary phosphonium sulfonate.

It has been discovered that excellent adhesion to the rotary cooling drum is attained, high-speed winding speed is achieved and stable film productivity is obtained when a film is produced from a polyalkylene naphthalate obtained by optimizing the concentrations and ratio of the antimony compound and the quaternary phosphonium sulfonate having an ester-forming functional group in accordance with the electrostatic casting method. It has also been found that the obtained film has excellent surface flatness and uniformity and is suitable for use in high-density magnetic recording media.

Means for Solving the Problem

The present invention has been accomplished based on the above findings and is a polyalkylene naphthalate for a film, which comprises a naphthalenedicarboxylic acid component as a main dicarboxylic acid component and an aliphatic glycol component as a main glycol component and contains (a) an antimony compound and (b) a quaternary phosphonium sulfonate compound unit having an ester-forming functional group in such amounts which satisfy the following expressions (1) and (2):

$$0 < Sb \leq 80 \quad (1)$$

$$0 < S/Sb \leq 0.4 \quad (2)$$

wherein Sb and S are the molar ratios (mmol %) of the antimony compound and the quaternary phosphonium sulfonate compound unit having an ester-forming functional group to the total of all the dicarboxylic acid components forming the polyalkylene naphthalate, respectively.

The present invention will be described in detail hereunder.

The polyalkylene naphthalate of the present invention is a polyester which comprises a naphthalenedicarboxylic acid component as a main dicarboxylic acid component and an aliphatic glycol component as a main glycol component. The term "main" means that alkylene naphthalate units account for at least 70 mol %, preferably at least 80 mol % of the total of all the recurring units forming the polyester.

The polyalkylene naphthalate is substantially linear and has excellent film-forming properties, especially film-forming properties by melt molding.

Preferable examples of the naphthalenedicarboxylic acid include 2,6-naphthalenedicarboxylic acid, 2,7-naphthalenedicarboxylic acid and the like when a direct esterification method is employed. When the polymer is produced by an ester interchange method, lower alkyl esters of these dicarboxylic acids may be used as a raw material.

These lower alkyl esters include, for example, dimethyl 2,6-naphthalene dicarboxylate, diethyl 2,6-naphthalene dicarboxylate, dimethyl 2,7-naphthalene dicarboxylate and the like. Of these, dimethyl 2,6-naphthalene dicarboxylate is preferable because it can be acquired easily industrially.

Illustrative examples of the aliphatic glycol in the present invention include polymethylene glycols having 2 to 10 carbon atoms such as ethylene glycol, propylene glycol, 1,4-butanediol and 1,4-cyclohexane dimethanol; and alicyclic diols such as cyclohexane dimethanol. Of these, ethylene glycol, propylene glycol and 1,4-butanediol are preferable, and ethylene glycol is the most preferable.

The polyester of the present invention may be a copolymer obtained by copolymerizing a small amount of a comonomer in limits that do not impair the characteristic properties of the polyester.

This third component is preferably a diol such as diethylene glycol, neopentyl glycol, polyalkylene glycol or 1,4-cyclohexane dimethanol as a glycol component. Of these, diethylene glycol is preferable.

The content of the diethylene glycol unit in the polyalkylene naphthalate is preferably 0.4 to 3 wt %, particularly preferably 0.8 to 2 wt %. When the content of the diethylene glycol unit Is smaller than 0.4 wt %, the crystallization of a polymer cannot be suppressed and melting energy becomes large, whereby an unmolten polymer remains at the time of film formation and large protrusions are formed on the surface of the film disadvantageously. On the other hand, when the content is larger than 3 wt %, strength after film formation, such as Young's modulus, lowers, resulting In deteriorated durability.

Illustrative examples of a dicarboxylic acid component as the third component in the polyalkylene naphthalate of the present invention include dicarboxylic acids such as terephthalic acid, isophthalic acid, succinic acid, adipic acid, sebacic acid and phthalic acid; ester-forming derivatives thereof; polyfunctional polycarboxylic acids such as trimellitic acid and pyromellitic acid; and ester-forming derivatives thereof. Of these, terephthalic acid, isophthalic acid and ester-forming derivatives thereof (such as dimethyl terephthalate and dimethyl isophthalate) are preferable. A terephthalic aid component or an isophthalic acid component is preferably contained in an amount of 20 mol % or less based on the total of all the dicarboxylic acid components to prevent the effect of the present invention from being impaired. The amount thereof is particularly preferably 10 mol % or less.

The polyalkylene naphthalate of the present invention may contain a component derived from an oxycarboxylic acid component such as an aromatic oxyacid component exemplified by hydroxybenzoic acid and an aliphatic oxyacid exemplified by ω-hydroxycaproic acid as long as it does not impair the object of the present invention.

It is particularly advantageous that the polyalkylene naphthalate of the present invention should contain ethylene-2,6-naphthalate or ethylene-2,7-naphthalate in an amount of at least 80 mol %, preferably at least 90 mol %, based on the total of all the recurring units.

The polyalkylene naphthalate of the present invention may further contain such additives as an optical stabilizer, antioxidant and light screening agent as required in limits that do not impair physical properties such as surface flatness and dry hot-air degradation resistance.

The polyalkylene naphthalate of the present Invention may be produced by a method known per se. For example, it is preferably produced by subjecting an ester-forming derivative of naphthalenedicarboxylic acid and an aliphatic glycol to an ester interchange reaction while heating them in the presence of an ester interchange catalyst and then to a polycondensation reaction in the presence of a polycondensation catalyst.

The above polyester preferably has an intrinsic viscosity measured at 35° C. in o-chlorophenol of 0.4 to 0.9, particularly preferably 0.45 to 0.75 (the term "intrinsic viscosity" in the following description refers to a value measured at 35° C. in o-chlorophenol unless otherwise stated).

The amount of an antimony compound as a catalyst in the a polyalkylenenaphthalate of the present invention must satisfy the following expression (1):

$$0 < Sb \leq 80 \quad (1)$$

wherein Sb is the molar ratio (mmol %) of the antimony compound to the total of all the dicarboxylic acid components, preferably the following expression (1'):

$$5 \leq Sb \leq 70 \quad (1').$$

The amount of Sb is particularly preferably in the range of 10 to 60 mmol %. When the amount is larger than 80 mmol %, black foreign matter derived from antimony is liable to be formed and the surface flatness of the obtained film is unsatisfactory disadvantageously. When the amount of Sb is too small, a polymerization reaction does proceed disadvantageously.

The antimony compound which can be used in the present invention is not particularly limited but antimony trioxide and antimony pentoxide may be used as the antimony compound. Of these, antimony trioxide is particularly preferable.

In the present invention, the antimony compound may be added before the start of an ester interchange reaction, during the ester interchange reaction, or after the ester interchange reaction and right before a polycondensation reaction.

In the present invention, the amount of the quaternary phosphonium sulfonate having an ester-forming functional group must satisfy the following expression (2):

$$0 < S/Sb \leq 0.4 \qquad (2)$$

wherein Sb and S are the molar ratios (mmol %) of the antimony compound and the quaternary phosphonium sulfonate unit having an ester-forming functional group to the total of all the dicarboxylic acid components forming the polyalkylene naphthalate, respectively,
preferably the following expression (2'):

$$0.001 \leq S/Sb \leq 0.3 \qquad (2').$$

The ratio S/Sb Is the most preferably in the range of 0.01 to 0.2.

When the ratio S/Sb is larger than 0.4, black foreign matter derived from antimony is liable to be formed, and the surface flatness of the obtained film is unsatisfactory disadvantageously. When the ratio is 0, the quaternary phosphonium sulfonate having an ester-forming functional group does not exist, resulting in poor electrostatic adhesion and low film productivity.

The quaternary phosphonium sulfonate having an ester-forming functional group which can be used in the present invention is preferably a compound represented by the following formula:

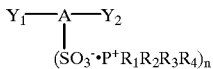

wherein A is a group containing an aromatic ring and having 6 to 18 carbon atoms, $Y_1$ and $Y_2$ are the same or different and each a hydrogen atom or ester-forming functional group (both $Y_1$ and $Y_2$ cannot be a hydrogen atom at the same time), n is 1 or 2, and $R_1$, $R_2$, $R_3$ and $R_4$ are the same or different and each an alkyl group having 1 to 18 carbon atoms, benzyl group or aryl group having 6 to 12 carbon atoms.

In the above formula, A is a group containing an aromatic ring and having 6 to 18 carbon atoms, preferably a group containing a benzene skeleton, naphthalene skeleton or biphenyl skeleton. The hydrogen of the aromatic nucleus of the aromatic ring may be substituted by an alkyl group having 1 to 12 carbon atoms or the like in addition to $Y_1$, $Y_2$ and a quaternary phosphonium sulfonate group.

$Y_1$ and $Y_2$ are each a hydrogen atom or ester-forming functional group but both cannot be a hydrogen atom at the same time. Illustrative examples of the ester-forming functional group include —COOH, —COOR', —OCOR', —(CH$_2$)$_m$OH, —(OCH$_2$)$_m$OH and the like. In these groups, R' is a lower alkyl group having 1 to 4 carbon atoms or phenyl group, and m is an integer of 1 to 10. R' is preferably methyl, ethyl, n-propyl, iso-propyl or n-butyl.

$R_1$, $R_2$, $R_3$ and $R_4$ forming the base portion ($P^+R_1R_2R_3R_4$) of a quaternary phosphonium sulfonate are the same or different and each an alkyl group having 1 to 18 carbon atoms, benzyl group, or aryl group having 6 to 12 carbon atoms. The alkyl group having 1 to 18 carbon atoms is methyl, ethyl, propyl, butyl, dodecyl, stearyl or the like. The aryl group having 6 to 12 carbon atoms is phenyl, naphthyl, biphenyl or the like, for example.

Preferable examples of the quaternary phosphonium sulfonate include tetrabutyl phosphonium 3,5-dicarboxybenzene sulfonate, ethyltributyl phosphonium 3,5-dicarboxybenzene sulfonate, benzyltributyl phosphonium 3,5-dicarboxybenzene sulfonate, phenyltributyl phosphonium 3,5-dicarboxybenzene sulfonate, tetraphenyl phosphonium 3,5-dicarboxybenzene sulfonate, butyltriphenyl phosphonium 3,5-dicarboxybenzene sulfonate, tetrabutyl phosphonium 3,5-dicarboxymethoxybenzene sulfonate, ethyltributyl phosphonium 3,5-dicarboxymethoxybenzene sulfonate, benzyltributyl phosphonium 3,5-dicarboxymethoxybenzene sulfonate, phenyltributyl phosphonium 3,5-dicarboxymethoxybenzene sulfonate, tetrabutyl phosphonium 3,5-di(β-hydroxyethoxycarbonyl)benzene sulfonate, tetraphenyl phosphonium 3,5-di(β-hydroxyethoxycarbonyl)benzene sulfonate, tetrabutyl phosphonium 3-dicarboxybenzene sulfonate, tetraphenyl phosphonium 3-dicarboxybenzene sulfonate, tetrabutyl phosphonium 3-di(β-hydroxyethoxycarbonyl)benzene sulfonate, tetraphenyl phosphonium 3-di(β-hydroxyethoxycarbonyl)benzenesulfonate, tetrabutyl phosphonium 4-di(β-hydroxyethoxycarbonyl)benzene sulfonate, bisphenol A-3,3-di(tetrabutyl phosphonium sulfonate), tetrabutyl phosphonium 2,6-dicarboxynaphthalene-4-sulfonate and the like. These quaternary phosphonium sulfonates may be used alone or in combination of two or more.

The above quaternary phosphonium sulfonate is preferably contained in the polyalkylene naphthalate of the present invention to ensure that the polyalkylene naphthalate should have an AC volume resistivity of $2.0 \times 10^8$ Ωcm or less while it is molten. The polyalkylene naphthalate having an AC volume resistivity of $2.0 \times 10^8$ Ωcm or less while it is molten can provide a sufficient amount of charge to adhere closely to the cooling drum which rotates relatively fast and can improve a film-forming speed, which is one of the objects of the present invention.

In the present invention, the above quaternary phosphonium sulfonate may be contained in the main chain or at the terminal of the polyalkylene naphthalate, that is, copolymerized or simply mixed into the polymer. In any one of the above states, the film-forming speed can be improved.

In the present invention, the polyalkylene naphthalate preferably has an AC volume resistivity of $2.0 \times 10^8$ to $6.0 \times 10^6$ Ωcm while it is molten.

In the present invention, to contain the quaternary phosphonium sulfonate having an ester-forming functional group in the polyalkylene naphthalate, the quaternary phosphonium sulfonate may be added in a desired stage before the synthesis of the above polyalkylene naphthalate is completed. Preferably, it is added before the start of the polycondensation reaction of the polyalkylene naphthalate.

Alternatively, a polyalkylene naphthalate containing a quaternary phosphonium sulfonate having an ester-forming functional group In a concentration higher than the above concentration is first produced and then blended with a polyalkylene naphthalate containing no quaternary phosphonium sulfonate component in the film production process to control the content of the quaternary phosphonium sulfonate to a predetermined level, and then the resulting blend is molten and formed into a film.

According to studies conducted by the inventors of the present invention, it has been found that the polyalkylene naphthalate of the present invention preferably further contains a calcium compound, a magnesium compound and a phosphorus compound in such amounts that satisfy the following expressions (3) to (5):

$$10 \leq (Mg+Ca) \leq 120 \quad (3)$$

$$0.5 \leq Mg/Ca \leq 10 \quad (4)$$

$$0.5 \leq (Mg+Ca)/P \leq 8.0 \quad (5)$$

wherein Mg, Ca and P are the molar ratios (mmol %) of the magnesium compound, the calcium compound and all the phosphorus compounds containing the quaternary phosphonium sulfonate compound unit having an ester-forming functional group to the total of all the dicarboxylic acid components forming the polyalkylene naphthalate, respectively.

The calcium compound, magnesium compound and phosphorus compound are preferably added in such amounts that satisfy the following expressions (3'), (4') and (5'):

$$20 \leq (Mg+Ca) \leq 110 \quad (3')$$

$$0.5 \leq Mg/Ca \leq 9 \quad (4')$$

$$1 \leq (Mg+Ca)/P \leq 7 \quad (5')$$

wherein Mg, Ca and P are the same as defined in the above expressions (3), (4) and (5).

The calcium compound and the magnesium compound which can be used in the present invention are preferably oxides, chlorides, carbonates, carboxylates or the like of Ca and Mg, particularly preferably acetates, that is, calcium acetate and magnesium acetate, respectively.

In the present invention, the calcium compound and the magnesium compound may be added in any stage of the production process of a polyester.

The calcium compound and the magnesium compound have the effect of reducing the resistivity of the polyalkylene naphthalate of the present invention when the polymer is molten. However, these compounds may also be used as an ester interchange reaction catalyst when an ester interchange reaction between dimethyl naphthalene dicarboxylate and an aliphatic glycol is carried out in the stage of production.

When they are used as an ester interchange reaction catalyst, they are added before the start of the ester interchange reaction.

The timing of adding these compounds is not particularly limited when they do not need to function as an ester interchange reaction catalyst. However, these compounds are preferably added before the intrinsic viscosity of the reaction polymer reaches 0.2 because these compounds can be readily dispersed into the polymer uniformly. As for the addition sequence of these compounds, the compounds may be added at the same time or different times.

As for the amounts of the calcium compound and the magnesium compound added in the present invention, the magnesium compound and the calcium compound soluble in a reaction system are added as ester interchange catalysts in such amounts that the total content of Mg and Ca should become 10 to 120 mmol %, preferably 20 to 110 mmol %, particularly preferably 30 to 100 mmol %, based on the total of all the dicarboxylic acid components to obtain a polyalkylene naphthalene by an ester interchange method. The unit "mmol %" in the following description represents the amount of each element in unit of mmol % based on the total of all the dicarboxylic acid components.

When the total content is larger than 120 mmol %, the surface flatness of the formed film is unsatisfactory due to the influence of deposited particles of the residual catalyst disadvantageously. On the other hand, when the total content is smaller than 10 mmol %, the ester interchange reaction becomes incomplete and the subsequent polymerization reaction becomes slow disadvantageously.

The molar ratio (Mg/Ca) of magnesium to calcium is 0.5 to 10, preferably 0.5 to 9.0, particularly preferably 2.0 to 8.0. When the ratio is smaller than 0.5, the surface flatness of the formed film is unsatisfactory due to the influence of deposited particles of the residual catalyst.

When the ratio is larger than 10, the characteristic properties of the formed film is unsatisfactory disadvantageously.

The phosphorus compound is further added to deactivate part of the ester interchange reaction catalysts. The molar ratio of the total amount of the ester interchange reaction catalysts, that is, calcium and magnesium, to the total amount of phosphorus containing the quaternary phosphonium sulfonate having an ester-forming functional group, namely, (Mg+Ca)/P, is in the range of 0.5 to 8.0, preferably 1.0 to 7.0, particularly preferably 2.0 to 7.0.

When this ratio is larger than 8, the surface flatness of the formed film is unsatisfactory due to the influence of deposited particles of the residual catalyst disadvantageously. On the other hand, when the ratio is smaller than 0.5, the antimony compound as a polymerization catalyst is deactivated by the phosphorus compound whose amount is excessive as compared with the ester interchange reaction catalysts, whereby a polymerization reaction takes substantially a long time and productivity lowers.

In the present invention, the phosphorus compound is preferably added after the ester interchange reaction or esterification reaction is substantially completed. The whole amount of the phosphorus compound may be added at a time or divided into two or more parts and added two or more times.

The phosphorus compound which can be used in the present invention is preferably trimethyl phosphate, triethyl phosphate, tri-n-butyl phosphate, phosphoric acid or the like. Of these, trimethyl phosphate is more preferable.

In the present invention, a trace amount of other metal compound such as a Zn, Co, Mn, K or Na compound may be contained in limits that do not prevent the object of the present invention.

The modified polyalkylene naphthalate obtained in the present invention does not contain or hardly contains an undissolved polymer formed by catalysts, has excellent film-forming properties and is particularly useful as a raw material for forming a film for a high-density magnetic recording medium.

Means of forming the modified polyalkylene naphthalate of the present invention into a film may be a known method. For example, a dried polyalkylene naphthalate is molten and extruded into a sheet at a temperature of [Tm] to [Tm+65]° C. (Tm is the melting point ° C. of a polyalkylene naphthalate) and solidified by quenching to give an unstretched film (or sheet). The unstretched film is then stretched by a sequentially biaxially stretching method, which comprises stretching the unstretched film in a longitudinal direction first and then in a transverse direction or in a transverse direction first and then in a longitudinal direction. The stretch temperature, stretch ratios and the like are selected according to means and conditions known per se.

According to the present invention, a film having excellent surface flatness can be obtained and a polyalkylene naphthalate which can be easily formed into a film at a high winding speed because of its excellent electrostatic adhesion and which therefore has high productivity can be obtained.

The inventors of the present invention have conducted further studies on the production of a film from the polyalkylene naphthalate of the present invention and found that when a film is produced from a composition having inert fine particles of specific shape uniformly dispersed in a polymer, the slipperiness and running durability of the film are further improved without impairing surface flatness and surface homogeneity.

Therefore, according to the present invention, there is provided a polyalkylene naphthalate composition for a film which comprises the polyalkylene naphthalate wherein the polyalkylene naphthalate comprises a naphthalenedicarboxylic acid component as a main dicarboxylic acid component and an aliphatic glycol component as a main glycol component, and contains (a) an antimony compound and (b) a quaternary phosphonium sulfonate compound unit having an ester-forming functional group in such amounts that satisfy the following expressions (1) and (2):

$$0 < Sb \leq 80 \tag{1}$$

$$0 < S/Sb \leq 0.4 \tag{2}$$

wherein Sb and S are the molar ratios (mmol %) of the antimony compound and the quaternary phosphonium sulfonate compound unit having an ester-forming functional group to the total of all the dicarboxylic acid components forming the polyalkylene naphthalate, respectively, and inert fine particles having an average particle diameter of 0.01 to 0.5 μm.

In the polyalkylene naphthalate composition, the types and ratio of the polymer components, antimony compound, quaternary phosphonium sulfonate, magnesium compound, calcium compound and phosphorus compound of the polyalkylene naphthalate have already been described in detail. Therefore, the descriptions of these will be omitted in the following text. The inert fine particles will be detailed hereunder.

The inert fine particles used in the composition of the present invention must have an average particle diameter of 0.01 to 0.5 μm, preferably 0.03 to 0.4 μm. When the average particle diameter is smaller than 0.01 μm, the obtained film has insufficient slipperiness and abrasion resistance. When the average particle diameter is larger than 0.5 μm, the surface roughness becomes too large and the film flatness is impaired, thereby making it impossible to obtain flatness required for the base film of a high-density magnetic recording medium.

Only one type or two or more different types of inert fine particles may be used. When two or more different types of inert fine particles are used, inert fine particles which differ in kind or particle size may be used, or a combination of inert fine particles different in both kind and particle size may be used.

The polyalkylene naphthalate composition of the present invention contains inert fine particles of the above size. The inert fine particles which can be used herein are inorganic fine particles such as silica, titania, alumina, zirconia, kaolinite or talc, or organic fine particles such as a crosslinked polymer exemplified by crosslinked polystyrene, crosslinked acryl and crosslinked polyesters. Of these, inert inorganic fine particles with a hydroxyl group having affinity with the polymer on the surface, such as silica particles, titania particles and alumina particles, are preferable.

The shapes of these particles are not particularly limited but spherical monodisperse inorganic fine particles are particularly preferable to make the surface of the film flatter and more uniform.

When spherical monodisperse inorganic fine particles are used, they preferably have a volume spherical coefficient (φ) defined by the following equation (6) of 0.30 to π/6. This range means that the particles have a spherical shape or a shape close to a spherical shape.

$$\phi = V/d^3 \tag{6}$$

(wherein V is an average volume (μm³) calculated from an average particle diameter obtained by a measurement method which will be described hereinafter, and d is the average (μm) of the largest diameters on the plane of projection.)

V can be easily calculated from an average particle diameter. d can also be easily obtained by observing particles under a scanning electron microscope, taking photos thereof and analyzing them.

The spherical monodisperse inorganic fine particles preferably have a pore capacity of 1.0 ml/g or less. When the pore capacity is larger than 1.0 ml/g, the particles are readily cracked, thereby causing cracking in the film formation step and deteriorating the running durability of a product.

The spherical monodisperse inorganic fine particles preferably have a specific surface area of 100 ml/g or less. When the specific surface area is larger than 100 ml/g, interaction between particles grows, whereby the agglomeration of particles readily occurs and the dispersibility of the particles deteriorates.

In the present invention, spherical silica particles having a particle diameter, shape, pore capacity and specific surface area which satisfy the above conditions are particularly effective and preferable.

In the present invention, the amount of the inert fine particles added is 0.01 to 10 wt %, preferably 0.01 to 5 wt %, particularly preferably 0.02 to 1 wt %, based on the polyalkylene naphthalate. When this amount is larger than 10 wt %, sufficient dispersibility cannot be obtained. On the other hand, when the amount is smaller than 0.01 wt %, an effect obtained by adding the particles is not fully developed.

Further, the inert fine particles contained in the obtained polyalkylene naphthalate composition are uniformly dispersed. Therefore, a film can be obtained that hardly undergoes the cracking of particles contained in the film and has a uniform surface and excellent slipperiness and abrasion resistance when a polyalkylene naphthalate film is stretched.

The polyalkylene naphthalate obtained in the present invention does not contain or hardly contains an undissolved polymer formed by the catalysts, has excellent film-forming properties and is particularly useful as a raw material for forming a base film for a high-density magnetic recording medium.

EXAMPLES

The following examples are given to further illustrate the present invention. It is to be understood that the present invention is not limited by the following examples and that various alterations and modifications may be made in the invention without departing from the spirit and scope of the invention. Various physical properties and characteristic properties in the following examples are measured and defined by the following methods.

(1) Flatness

The surface of a film piece is sputtered with aluminum and exposed to differential interference light by an optical microscope so as to observe a 3 mm×3 mm area at a magnification of 200×. The number of particles which can be considered as protrusions formed by the deposition of antimony is counted to evaluate the flatness of the film. The number of protrusions formed by the inert fine particles is subtracted from the count. That is, the count of protrusions including those formed by the inert fine particles is obtained by the following method.

Particles which can be considered as protrusions are marked and counted.

Thereafter, aluminum on the surface of the film is removed with an aqueous solution of sodium hydroxide and then the surface of the film is ion-etched stepwise with the sputtering device (1B-2 Ion Coater) of Eiko Engineering Co., Ltd. Carbon vapor deposition is carried out in each step, and the marked particles are observed under a scanning electron microscope to find whether any of the marked particles are formed by the inert fine particles. When the marked particles include those formed by the inert fine particles (such as agglomerates of the inert fine particles), flatness is evaluated from a value obtained by subtracting the number of such particles from the above count.

<Criteria>

⊚: 20 or less protrusions per mm$^2$

○: 21 to 40 protrusions per mm$^2$

×: 40 to 99 protrusions per mm$^2$

××100 or more protrusions per mm$^2$ (2) Deposited Particles in Polymer

When a polyester film has a magnetic layer and an in-line coating layer, these layers are peeled and removed with strong alkali water or an organic solvent, and then the film is fully washed with distilled water and dried. Even when the polyester film does not have a magnetic layer and the like, it is still fully washed with distilled water to remove substances adhered to the surface and dried.

100 Grams of the polyester film is collected, heated to 120 to 140° C. while 1 kg of o-chlorophenol is added and stirred, and maintained at that temperature for about 3 to 5 hours to dissolve the polyester. When a crystallized portion does not dissolve, heated o-chlorophenol is quenched and then the above dissolution operation is carried out again.

To remove dust or the like contained in the polyester, the above o-chlorophenol solution is filtered with a G-1 glass filter and the weight of the residue is subtracted from the weight of the sample.

The filtrate obtained by the filtration with the G-1 glass filter is centrifuged with the super centrifugal separator (55P-7, rotor type RP-30-2) of Hitachi, Ltd. at 30,000 rpm for 1 hour to separate coarse particles contained in the o-chlorophenol solution. The deposition of particles is confirmed by measuring the light transmittance of the o-chlorophenol solution before and after centrifugation and checking if the value, 375 $\mu$m, of light transmittance of the solution after centrifugation is higher than or the same as that before centrifugation. After centrifugation, the supernatant is removed by decantation to extract separated particles. Since there is a case where a polyester component is contained in the separated particles by incomplete centrifugation, o-chlorophenol having normal temperature is added to the extracted separated particles to disperse the separated particles uniformly with a ultrasonic disperser and then the mixture is subjected to super centrifugation. This operation must be repeated until the re-precipitation of the polyester component is not seen after an excessive amount of an organic solvent such as methanol is added to this supernatant.

The thus extracted separated particles (A) are dried under vacuum at 100° C. for 8 hours and weighed. The obtained separated particles are deposited particles derived from catalyst metal elements.

(3) Electrostatic Adhesion

The polymer is dried at 180° C., melt extruded at 305° C. and solidified by quenching on a casting drum maintained at 40° C. to give an unstretched film. Electrostatic adhesion is evaluated from winding speed at which the film can be wound up stably with small thickness non-uniformity by an electrostatic pinning method.

○: winding speed of 40 m/min or more

Δ: winding speed of 30 m/min or more and less than 40 m/min ×: winding speed of less than 30 m/min (4) Dispersibility A sample film piece is fixed on the sample table of a scanning electron microscope and the surface of the film is ion-etched with the sputtering device (1B-2 Ion Coater) of Eiko Engineering Co., Ltd. under the following conditions.

As for the conditions, the sample is placed in a cylinder jar, the degree of vacuum is raised to about 5×10$^{-2}$ Torr, and ion-etching is carried out at a voltage of 0.90 kV and a current of 5 mA for about 5 minutes. Further, the surface of the film is sputtered with gold by the same device and a 5 $\mu$m×10 $\mu$m area is observed at a magnification of 5,000× under a scanning electron microscope to observe and evaluate the agglomeration of particles.

○: less than 15% of all the particles within the measurement area are existent as agglomerated particles.

Δ: 15% or more and less than 30% of all the particles within the measurement area are existent as agglomerated particles. ×: 30% or more of all the particles within the measurement area are existent as agglomerated particles.

(5) Average Particle Diameter of Particles

The average particle diameter of particles is measured by the following method.

Water is added to a dispersion prepared by dispersing inert inorganic particles in a medium to prepare a low-concentration solution and then the average particle diameter of the particles is measured with the centrifugal particle size analyzer (CAPA-500) of Shimadzu Corporation.

(6) Film Production Stability

Film production stability is evaluated from thickness non-uniformity when a film is produced at a winding speed of 50 m/min. That is, a sample film piece having a width of 2 m is cut out of the obtained film and the thickness of the film is measured with the electron micrometer of Anritsu Denshi Co., Ltd. to obtain changes in thickness and average value so as to evaluate film production stability based on the following criteria.

<Criteria>

⊚: The difference between average thickness and maximum or minimum thickness is less than 0.3 $\mu$m.

○: The difference between average thickness and maximum or minimum thickness is 0.3 $\mu$m or more and less than 0.5 $\mu$m. ×: The difference between average thickness and maximum or minimum thickness is 0.5 $\mu$m or more.

Example 1

Diethylene glycol was added to 100 parts of dimethyl 2,6-naphthalene dicarboxylate and 60 parts of ethylene glycol in the presence of 0.045 part of magnesium acetate tetrahydrate and 0.009 part of calcium acetate monohydrate as ester interchange reaction catalysts, in such an amount that its content in the polymer became 0.7 wt %.

An ester interchange reaction was carried out in accordance with a commonly used method, and then 0.011 part of trimethyl phosphate was added to substantially terminate the ester interchange reaction.

Thereafter, a mixture of 0.023 part of antimony trioxide and 0.002 part of tetrabutylphosphonium 3,5-dicarboxybenzene sulfonate was added. Then, the mixture was transferred to a polymerizer and a polycondensation reaction was carried out in accordance with a commonly used method at a vacuum pressure of 26.7 Pa or less by elevating the temperature to 295° C. to give modified polyethylene naphthalate having an intrinsic viscosity of 0.61. This modified polyethylene naphthalate had an AC volume resistivity at 290° C. of $3.1\times10^7$ Ωcm.

Pellets of this modified polyethylene naphthalate were dried at 170° C. for 3 hours, supplied to the hopper of an extruder, melt extruded to a width of 200 μm through a 1-mm slit die at a melting temperature of 290° C., subjected to approximately 0.3 sec of surface finishing with a linear electrode, and closely adhered to and solidified on a rotary cooling drum having a surface temperature of 20° C. At this point, the maximum casting speed at which a cooled film could be produced stably by increasing the speed of the cooling drum gradually without producing surface defects on the film caused by poor adhesion was 50 m/min. Thereafter, this unstretched film was preheated at 75° C., stretched to 3.6 times between low-speed and high-speed rolls by heating with a single IR heater having a surface temperature of 900° C. from 15 mm above the film and then supplied to a stenter to be stretched to 3.9 times in a transverse direction at 105° C. The obtained biaxially oriented film was heat-set at 230° C. for 5 seconds to give a 14-μm-thick heat-set biaxially oriented modified polyethylene naphthalate film.

The characteristic properties of this film are shown in Table 1 and Table 2.

Example 2

A mixture of 30 parts of ethylene glycol and 0.01 part of tetrabutyl phosphonium 3,5-dicarboxybenzene sulfonate was added to 120 parts of a bis-β-hydroxyethyl ester of 2,6-naphthalenedicarboxylic acid and 85 parts of 2,6-naphthalenedicarboxylic acid, and then diethylene glycol was further added in such an amount that its content in the polymer became 1.0 wt % to carry out an esterification reaction at a temperature of 210 to 230° C.

After the reaction was terminated when the amount of water formed by the reaction became 13 parts, 0.045 part of magnesium acetate tetrahydrate, 0.009 part of calcium acetate monohydrate and 0.02 part of trimethyl phosphate were added and stirred for 10 minutes, and then 0.046 part of antimony trioxide was added. Thereafter, the reaction product was transferred to a polymerizer and a polycondensation reaction was carried out at a vacuum pressure of 26.7 Pa or less by elevating the temperature to 295° C. to give modified polyethylene naphthalate having an intrinsic viscosity of 0.61. This modified polyethylene naphthalate had an AC volume resistivity at 290° C. of $3.1\times10^7$ Ωcm.

A modified polyethylene naphthalate film was formed from this modified polyethylene naphthalate in the same manner as in Example 1.

As for the characteristic properties of this film, as shown in Table 1 and Table 2, the film had a small number of deposited particles and excellent flatness and electrostatic adhesion.

Example 3

A modified polyethylene naphthalate film was obtained in the same manner as in Example 1 except that 100 parts of dimethyl 2,6-naphthalene dicarboxylate was changed to 91 parts of dimethyl 2,6-naphthalene dicarboxylate and 9 parts of dimethyl isophthalate. As for the characteristic properties of this film, as shown in Table 1 and Table 2, the film had a small number of deposited particles and excellent flatness and electrostatic adhesion.

Examples 4 to 6

Modified polyethylene naphthalate films were obtained in the same manner as in Example 1 except that the amounts of tetrabutyl phosphonium 3,5-dicarboxybenzene sulfonate, magnesium acetate, calcium acetate, trimethyl phosphate and antimony trioxide were changed as shown in Table 1. As for the characteristic properties of these films, as shown in Table 1 and Table 2, the films had a small number of deposited particles and excellent flatness and electrostatic adhesion.

Example 7

A modified polyethylene naphthalate film was obtained in the same manner as in Example 3 except that the amount of isophthalic acid was changed as shown in Table 1. As for the characteristic properties of this film, as shown in Table 1 and Table 2, the film had a small number of deposited particles and excellent flatness and electrostatic adhesion.

Example 8

A modified polyethylene naphthalate film was obtained in the same manner as in Example 3 except that acid components other than naphthalenedicarboxylic acid and their amounts were changed as shown in Table 1. As for the characteristic properties of this film, as shown in Table 1 and Table 2, the film had a small number of deposited particles and excellent flatness and electrostatic adhesion.

Comparative Examples 1 to 4

Modified polyethylene naphthalate films were obtained in the same manner as in Example 1 except that the amounts of tetrabutyl phosphonium 3,5-dicarboxybenzene sulfonate, magnesium acetate, trimethyl phosphate, diethylene glycol and antimony trioxide were changed as shown in Table 1. As for the characteristic properties of these films, as shown in Table 1 and Table 2, the films had low flatness and a large number of deposited particles.

TABLE 1

| | polymer | | | | | | | | |
|---|---|---|---|---|---|---|---|---|---|
| | content of each metal element | | | content of phosphate | content of sulfonate | acid components other than naphthalenedicarboxylic acid | | | |
| | (mmol %) | | | (mmol %) | (mmol %) | | quantity | | |
| | Mg | Ca | Sb | P | S | type | (mol %) | Mg + Ca | Mg/Ca |
| Ex. 1 | 50 | 20 | 20 | 19 | 0.5 | — | — | 70.0 | 2.5 |
| Ex. 2 | 50 | 20 | 20 | 19 | 0.5 | — | — | 70.0 | 2.5 |

TABLE 1-continued

| | polymer | | | | | | acid components other than naphthalenedicarboxylic acid | | calculated | |
|---|---|---|---|---|---|---|---|---|---|---|
| | content of each metal element | | | content of phosphate | content of sulfonate | | | | | |
| | (mmol %) | | | (mmol %) | (mmol %) | | quantity | | | |
| | Mg | Ca | Sb | P | S | type | (mol %) | Mg + Ca | Mg/Ca |
| Ex. 3 | 50 | 20 | 20 | 19 | 0.5 | isophthalic acid | 10 | 70.0 | 2.5 |
| Ex. 4 | 50 | 20 | 40 | 25 | 15 | — | — | 70.0 | 2.5 |
| Ex. 5 | 70 | 30 | 20 | 19 | 1 | — | — | 100.0 | 2.3 |
| Ex. 6 | 30 | 40 | 10 | 15 | 2 | — | — | 70.0 | 0.8 |
| Ex. 7 | 50 | 20 | 20 | 19 | 0.5 | isophthalic acid | 5 | 70.0 | 2.5 |
| Ex. 8 | 50 | 20 | 20 | 19 | 0.5 | terephthalic acid | 10 | 70.0 | 2.5 |
| C. Ex. 1 | 50 | 20 | 50 | 19 | 30 | — | — | 70.0 | 2.5 |
| C. Ex. 2 | 50 | 20 | 20 | 19 | 0 | — | — | 70.0 | 2.5 |
| C. Ex. 3 | 70 | 30 | 50 | 25 | 30 | — | — | 100.0 | 2.3 |
| C. Ex. 4 | 50 | 20 | 50 | 19 | 30 | — | — | 70.0 | 2.5 |

Ex.: Example; C. Ex.: Comparative Example

TABLE 2

| | polymer | | | | film evaluation | | |
|---|---|---|---|---|---|---|---|
| | calculated values | | content of diethylene glycol | | deposited particles | electrostatic adhesion | film production stability |
| | (Mg + Ca)/P | S/Sb | (wt %) | flatness | (wt %) | | |
| Ex. 1 | 3.7 | 0.025 | 0.7 | ⊙ | ≦0.01 | ○ | ⊙ |
| Ex. 2 | 3.7 | 0.025 | 1.0 | ⊙ | ≦0.01 | ○ | ⊙ |
| Ex. 3 | 3.7 | 0.025 | 0.7 | ⊙ | ≦0.01 | ○ | ⊙ |
| Ex. 4 | 2.8 | 0.375 | 0.7 | ⊙ | ≦0.01 | ○ | ⊙ |
| Ex. 5 | 5.3 | 0.050 | 0.7 | ○ | 0.01 | ○ | ⊙ |
| Ex. 6 | 4.7 | 0.200 | 0.7 | ○ | 0.01 | ○ | ⊙ |
| Ex. 7 | 3.7 | 0.025 | 0.7 | ⊙ | ≦0.01 | ○ | ⊙ |
| Ex. 8 | 3.7 | 0.025 | 0.7 | ○ | 0.01 | ○ | ⊙ |
| C. Ex. 1 | 3.7 | 0.600 | 0.7 | × | 0.02 | ○ | ⊙ |
| C. Ex. 2 | 3.7 | 0.000 | 0.7 | × | 0.01 | × | × |
| C. Ex. 3 | 4.0 | 0.600 | 0.7 | × | 0.03 | ○ | ⊙ |
| C. Ex. 4 | 3.7 | 0.600 | 0.3 | ×× | 0.03 | ○ | ⊙ |

Ex.: Example; C. Ex.: Comparative Example

Example 9

Diethylene glycol was added to 100 parts of dimethyl 2,6-naphthalene dicarboxylate and 60 parts of ethylene glycol in the presence of 0.045 part of magnesium acetate tetrahydrate and 0.009 part of calcium acetate monohydrate as ester interchange reaction catalysts, in such an amount that its content in the polymer became 0.7 wt %.

An ester interchange reaction was carried out in accordance with a commonly used method, and then 0.011 part of trimethyl phosphate was added to substantially terminate the ester interchange reaction.

Thereafter, 0.023 part of antimony trioxide and 0.002 part of tetrabutyl phosphonium 3,5-dicarboxybenzene sulfonate were added. Spherical silica having an average particle diameter of 0.06 μm was further added to a concentration in the polymer of 0.05 wt %. The resulting mixture was then transferred to a polymerizer and a polycondensation reaction was carried out in accordance with a commonly used method at a vacuum pressure of 26.7 Pa or less by elevating the temperature to 295° C. to give a polyethylene naphthalate composition having an intrinsic viscosity of 0.61. This polyethylene naphthalate composition had an AC volume resistivity at 290° C. On 3.1×10$^7$ Ωcm.

Pellets of this polyethylene naphthalate were dried at 170° C. for 3 hours, supplied to the hopper of an extruder, melt extruded to a width of 200 μm through a 1-mm slit die at a melting temperature of 290° C., subjected to 0.3 sec of surface finishing with a linear electrode, and closely adhered to and solidified on a rotary cooling drum having a surface temperature of 20° C. At this point, the maximum casting speed at which a cooled film could be produced stably by increasing the speed of the cooling drum gradually without producing surface defects on the film caused by poor adhesion was 50 m/min. Thereafter, this unstretched film was preheated at 75° C., stretched to 3.6 times between low-speed and high-speed rolls by heating with a single IR heater having a surface temperature of 900° C. from 15 mm above the film and then supplied to a stenter to be stretched to 3.9 times in a transverse direction at 105° C. The obtained biaxially oriented film was heat-set at 230° C. for 5 seconds to give a 14-μm-thick heat-set biaxially oriented film.

The characteristic properties of this film are shown in Table 3, Table 4 and Table 5.

Example 10

A mixture of 30 parts of ethylene glycol and 0.01 part of tetrabutyl phosphonium 3,5-dicarboxybenzene sulfonate was added to 120 parts of a bis-β-hydroxyethyl ester of 2,6-naphthalenedicarboxylic acid and 85 parts of 2,6-naphthalenedicarboxylic acid, and then diethylene glycol was further added in such an amount that its content in the polymer became 1.0 wt % to carry out an esterification reaction at a temperature of 210 to 230° C.

After the reaction was terminated when the amount of water formed by the reaction became 13 parts, 0.045 part of magnesium acetate tetrahydrate, 0.009 part of calcium acetate monohydrate and 0.02 part of trimethyl phosphate were added and stirred for 10 minutes, and then 0.046 part of antimony trioxide was added. Then, spherical silica having an average particle diameter of 0.06 μm was further added to a concentration in the polymer of 0.05 wt %. Thereafter, the reaction product was transferred to a polymerizer and a polycondensation reaction was carried out at a vacuum pressure of 26.7 Pa or less by elevating the temperature to 295° C. to give a polyethylene naphthalate composition having an intrinsic viscosity of 0.61. This polyester had an AC volume resistivity at 290° C. On $3.1 \times 10^7$ Ωcm.

A polyethylene naphthalate film was formed from this obtained polyethylene naphthalate composition in the same manner as in Example 9.

The characteristic properties of this film are shown in Table 3, Table 4 and Table 5.

Example 11

A polyethylene naphthalate film was obtained in the same manner as in Example 9 except that 100 parts of dimethyl 2,6-naphthalene dicarboxylate was changed to 91 parts of dimethyl 2,6-naphthalene dicarboxylate and 9parts of dimethyl isophthalate. The characteristic properties of this film are shown in Table 3, Table 4 and Table 5.

Examples 12 to 17

Polyethylene naphthalate films were obtained in the same manner as in Example 9 except that the amounts of tetrabutyl phosphonium 3,5-dicarboxybenzene sulfonate, magnesium acetate, calcium acetate, trimethyl phosphate and antimony trioxide, and the type, amount and average particle diameter of the inert fine particles to be added were changed as shown in Table3, Table 4and Table 5. The characteristic properties of these films are shown in Table 3, Table 4 and Table 5.

Examples 18 and 19

Polyethylene naphthalate films were obtained in the same manner as in Example 11 except that the types and amounts of acid components other than naphthalenedicarboxylic acid and the average particle diameter of the inert fine particles were changed as shown in Table 3, Table 4 and Table 5. The characteristic properties of these films are shown in Table 3, Table 4 and Table 5.

Example 20

A polyethylene naphthalate film was obtained in the same manner as in Example 9 except that the concentration in the polymer of spherical silica was changed as shown in Table 3, Table 4 and Table 5. The characteristic properties of this film are shown in Table 3, Table 4 and Table 5.

Comparative Examples 5 to 7

Polyethylene naphthalate films were obtained in the same manner as in Example 9 except that the amounts of tetrabutyl phosphonium 3,5-dicarboxybenzene sulfonate, magnesium acetate, trimethyl phosphate, diethylene glycol and antimony trioxide, and the type, amount and average particle diameter of the inert fine particles to be added were changed as shown in Table3, Table 4 and Table 5. The characteristic properties of these films are shown in Table 3, Table 4 and Table 5.

TABLE 3

| | polymer composition | | | | | | | | |
|---|---|---|---|---|---|---|---|---|---|
| | content of each metal element (mmol %) | | | content of phosphate (mmol %) | content of sulfonate* (mmol %) | calculated values | | | |
| | Mg | Ca | Sb | P | S | Mg + Ca | Mg/Ca | (Mg + Ca)/P | S/Sb |
| Ex. 9 | 50 | 20 | 20 | 19 | 0.5 | 70.0 | 2.5 | 3.7 | 0.025 |
| Ex. 10 | 50 | 20 | 20 | 19 | 0.5 | 70.0 | 2.5 | 3.7 | 0.025 |
| Ex. 11 | 50 | 20 | 20 | 19 | 0.5 | 70.0 | 2.5 | 3.7 | 0.025 |
| Ex. 12 | 50 | 20 | 40 | 25 | 15 | 70.0 | 2.5 | 2.8 | 0.375 |
| Ex. 13 | 70 | 30 | 20 | 19 | 1 | 100.0 | 2.3 | 5.3 | 0.050 |
| Ex. 14 | 30 | 40 | 10 | 19 | 2 | 70.0 | 0.8 | 3.7 | 0.200 |
| Ex. 15 | 50 | 20 | 20 | 19 | 0.5 | 70.0 | 2.5 | 3.7 | 0.025 |
| Ex. 16 | 50 | 20 | 20 | 19 | 0.5 | 70.0 | 2.5 | 3.7 | 0.025 |
| Ex. 17 | 50 | 20 | 20 | 19 | 0.5 | 70.0 | 2.5 | 3.7 | 0.025 |
| Ex. 18 | 50 | 20 | 20 | 19 | 0.5 | 70.0 | 2.5 | 3.7 | 0.025 |
| Ex. 19 | 50 | 20 | 20 | 19 | 0.5 | 70.0 | 2.5 | 3.7 | 0.025 |
| Ex. 20 | 50 | 20 | 20 | 19 | 0.5 | 70.0 | 2.5 | 3.7 | 0.025 |
| C. Ex. 5 | 50 | 20 | 20 | 19 | 0.5 | 70.0 | 2.5 | 3.7 | 0.025 |
| C. Ex. 6 | 70 | 30 | 50 | 25 | 30 | 100.0 | 2.3 | 4.0 | 0.600 |
| C. Ex. 7 | 70 | 30 | 50 | 19 | 30 | 100.0 | 2.3 | 5.3 | 0.600 |

Ex.: Example; C. Ex.: Comparative Example
sulfonate*: tetrabutyl phosphonium 3,5-dicarboxybenzene sulfonate

TABLE 4

| | polymer composition | | | | | |
|---|---|---|---|---|---|---|
| | acid components other than naphthalenedicarboxylic acid | | inert fine particles | | | content of diethylene glycol (wt %) |
| | type | quantity (mol %) | type | average particle diameter (μm) | content (wt %) | |
| Ex. 9 | — | — | spherical silica | 0.06 | 0.05 | 0.7 |
| Ex. 10 | — | — | spherical silica | 0.06 | 0.05 | 1.0 |
| Ex. 11 | isophthalic acid | 10 | spherical silica | 0.06 | 0.05 | 0.7 |
| Ex. 12 | — | — | spherical silica | 0.06 | 0.20 | 0.7 |
| Ex. 13 | — | — | spherical silica | 0.06 | 0.10 | 0.7 |
| Ex. 14 | — | — | spherical silica | 0.06 | 0.05 | 0.7 |
| Ex. 15 | — | — | silica alumina | 0.20 | 0.05 | 0.7 |
| Ex. 16 | — | — | alumina | 0.50 | 0.05 | 0.7 |
| Ex. 17 | — | — | titania | 0.50 | 0.05 | 0.7 |
| Ex. 18 | isophthalic acid | 5 | spherical silica | 0.10 | 0.05 | 0.7 |
| Ex. 19 | terephthalic acid | 10 | spherical silica | 0.10 | 0.05 | 0.7 |
| Ex. 20 | — | — | spherical silica | 0.06 | 3.00 | 0.7 |
| C. Ex. 5 | — | — | spherical silica | 3.00 | 0.05 | 0.7 |
| C. Ex. 6 | — | — | spherical silica | 3.00 | 0.10 | 0.7 |
| C. Ex. 7 | — | — | spherical silica | 3.00 | 11.00 | 0.3 |

Ex.: Example; C. Ex.: Comparative Example

TABLE 5

| | film evaluation | | | | |
|---|---|---|---|---|---|
| | flatness | deposited particles (wt %) | dispersibility | electrostatic adhesion | film production stability |
| Ex. 9 | ⊚ | ≦0.01 | ○ | ○ | ⊚ |
| Ex. 10 | ⊚ | ≦0.01 | ○ | ○ | ⊚ |
| Ex. 11 | ⊚ | ≦0.01 | ○ | ○ | ⊚ |
| Ex. 12 | ⊚ | ≦0.01 | ○ | ○ | ⊚ |
| Ex. 13 | ○ | 0.01 | ○ | ○ | ⊚ |
| Ex. 14 | ○ | 0.01 | ○ | ○ | ⊚ |
| Ex. 15 | ○ | 0.01 | ○ | ○ | ⊚ |
| Ex. 16 | ○ | 0.01 | ○ | ○ | ⊚ |
| Ex. 17 | ○ | 0.01 | ○ | ○ | ⊚ |
| Ex. 18 | ⊚ | ≦0.01 | ○ | ○ | ⊚ |
| Ex. 19 | ⊚ | 0.01 | ○ | ○ | ⊚ |
| Ex. 20 | ○ | ≦0.01 | △ | ○ | ⊚ |
| C. Ex. 5 | × | 0.02 | ○ | ○ | ⊚ |
| C. Ex. 6 | × | 0.03 | ○ | ○ | ⊚ |
| C. Ex. 7 | ×× | 0.03 | × | ○ | ⊚ |

Ex.: Example; C. Ex.: Comparative Example

As is obvious from the above results, the polyalkylene naphthalate of the present invention has excellent electrostatic adhesion and high-speed winding properties when a film is formed and the obtained film has no thickness non-uniformity and excellent surface flatness.

EFFECT OF THE INVENTION

According to the present invention, a polyalkylene naphthalate which has excellent electrostatic adhesion and is useful for the formation of a film for a magnetic recording medium, especially forhigh-density magnetic recording medium, can be produced efficiently.

What is claimed is:

1. A polyalkylene naphthalate for a film, which comprises a naphthalenedicarboxylic acid component as a main dicarboxylic acid component and an aliphatic glycol component as a main glycol component, and contains (a) an antimony compound and (b) a quaternary phosphonium sulfonate compound unit having an ester-forming functional group in such amounts that satisfy the following expressions (1) and (2):

$$0 < Sb \leq 80 \tag{1}$$

$$0 < S/Sb \leq 0.4 \tag{2}$$

wherein Sb and S are the molar ratios (mmol %) of the antimony compound and the quaternary phosphonium sulfonate compound unit having an ester-forming functional group to the total of all the dicarboxylic acid components forming the polyalkylene naphthalate, respectively.

2. The polyalkylene naphthalate for a film according to claim 1 which contains (a) an antimony compound and (b) a quaternary phosphonium sulfonate compound unit having an ester-forming functional group in such amounts that satisfy the following expressions (1') and (2'):

$$5 < Sb \leq 70 \tag{1'}$$

$$0.001 \leq S/Sb \leq 0.3 \tag{2'}$$

wherein Sb and S are the same as defined in claim 1.

3. The polyalkylene naphthalate for a film according to claim 1 which contains a magnesium compound, a calcium compound and a phosphorus compound in such amounts that satisfy the following expressions (3), (4) and (5):

$$10 \leq (Mg+Ca) \leq 120 \tag{3}$$

$$0.5 \leq Mg/Ca \leq 10 \tag{4}$$

$$0.5 \leq (Mg+Ca)/P \leq 10 \tag{5}$$

wherein Mg, Ca and P are the molar ratios (mmol %) of the magnesium compound, the calcium compound and all the phosphorus compounds including the quaternary phosphonium sulfonate compound unit having an ester-forming functional group to the total of all the dicarboxylic acid components forming the polyalkylene naphthalate, respectively.

4. The polyalkylene naphthalate for a film according to claim 1 which contains a magnesium compound, a calcium compound and a phosphorus compound in such amounts that satisfy the following expressions (3'), (4') and (5'):

$$20 \leq (Mg+Ca) \leq 110 \tag{3'}$$

$$0.5 \leq Mg/Ca \leq 9 \quad (4')$$

$$1 \leq (Mg+Ca)/P \leq 7 \quad (5')$$

wherein Mg, Ca and P are the same as defined in claim 3.

5. The polyalkylene naphthalate for a film according to claim 1, wherein the aliphatic glycol component is at least one glycol component selected from the group consisting of an ethylene glycol component, propylene glycol component and butylene glycol component.

6. The polyalkylene naphthalate for a film according to claim 1, wherein the polyalkylene naphthalate is a polyethylene naphthalate.

7. The polyalkylene naphthalate for a film according to claim 1, wherein the polyalkylene naphthalate contains a terephthalic acid component and/or an isophthalic acid component in an amount of 20 mol % or less based on the total of all the dicarboxylic acid components.

8. The polyalkylene naphthalate for a film according to claim 1, wherein the polyalkylene naphthalate contains ethylene-2,6-naphthalate units or ethylene-2,7-naphthalate units in an amount of at least 80 mol % of the total of all the recurring units.

9. The polyalkylene naphthalate for a film according to claim 1, wherein the polyalkylene naphthalate contains diethylene glycol units in an amount of 0.4 to 3 wt %.

10. A polyalkylene naphthalate composition for a film, which comprises a polyalkylene naphthalate wherein the polyalkylene naphthalate comprises a naphthalenedicarboxylic acid component as a main dicarboxylic acid component and an aliphatic glycol component as a main glycol component, and contains (a) an antimony compound and (b) a quaternary phosphonium sulfonate compound unit having an ester-forming functional group in such amounts that satisfy the following expressions (1) and (2):

$$0 < Sb \leq 80 \quad (1)$$

$$0 < S/Sb \leq 0.4 \quad (2)$$

wherein Sb and S are the molar ratios (mmol %) of the antimony compound unit and the quaternary phosphonium sulfonate compound unit having an ester-forming functional group to the total of all the dicarboxylic acid components forming the polyalkylene naphthalate, respectively, and inert fine particles having an average particle diameter of 0.01 to 0.5 μm.

11. The polyalkylene naphthalate composition for a film according to claim 10, wherein the inert fine particles are contained in an amount of 0.01 to 10 wt % based on the polyalkylene naphthalate.

12. The polyalkylene naphthalate composition for a film according to claim 10, wherein the inert fine particles are inorganic fine particles.

13. The polyalkylene naphthalate composition for a film according to claim 10, wherein the inert fine particles are silica particles, titania particles or alumina particles.

14. The polyalkylene naphthalate composition for a film according to claim 10, wherein the inert fine particles are monodisperse spherical inorganic fine particles having a pore capacity of 1.0 ml/g or less and a specific surface area of 100 m²/g or less.

15. The polyalkylene naphthalate composition for a film according to claim 10, wherein the inert fine particles are monodisperse spherical silica fine particles.

16. The polyalkylene naphthalate composition for a film according to claim 10 which contains (a) an antimony compound and (b) a quaternary phosphonium sulfonate compound unit having an ester-forming functional group in such amounts that satisfy the following expressions (1') and (2'):

$$5 < Sb \leq 70 \quad (1')$$

$$0.001 \leq S/Sb \leq 0.3 \quad (2')$$

wherein Sb and S are the same as defined in claim 10.

17. The polyalkylene naphthalate composition for a film according to claim 10 wherein the polyalkylene naphthalate contains a magnesium compound, a calcium compound and a phosphorus compound in such amounts that satisfy the following expressions (3), (4) and (5):

$$10 \leq (Mg+Ca) \leq 120 \quad (3)$$

$$0.5 \leq Mg/Ca \leq 10 \quad (4)$$

$$0.5 \leq (Mg+Ca)/P \leq 10 \quad (5)$$

wherein Mg, Ca and P are the molar ratios (mmol %) of the magnesium compound, the calcium compound and all the phosphorus compounds Including the quaternary phosphonium sulfonate compound unit having an ester-forming functional group to the total of all the dicarboxylic acid components forming the polyalkylene naphthalate, respectively.

18. The polyalkylene naphthalate composition for a film according to claim 10 wherein the polyalkylene naphthalate contains a magnesium compound, a calcium compound and a phosphorus compound in such amounts that satisfy the following expressions (3'), (4') and (5'):

$$20 \leq (Mg+Ca) \leq 110 \quad (3')$$

$$0.5 \leq Mg/Ca \leq 9 \quad (4')$$

$$1 \leq (Mg+Ca)/P \leq 7 \quad (5')$$

wherein Mg, Ca and P are the same as defined in claim 17.

19. The polyalkylene naphthalate composition for a film according to claim 10, wherein the aliphatic glycol component is at least one glycol component selected from the group consisting of an ethylene glycol component, propylene glycol component and butylene glycol component.

20. The polyalkylene naphthalate composition for a film according to claim 10, wherein the polyalkylene naphthalate is a polyethylene naphthalate.

21. The polyalkylene naphthalate composition for a film according to claim 10, wherein the polyalkylene naphthalate contains a terephthalic acid component and/or an isophthalic acid component in an amount of 20 mol % or less based on the total of all the dicarboxylic acid components.

22. The polyalkylene naphthalate composition for a film according to claim 10, wherein the polyalkylene naphthalate contains ethylene-2,6-naphthalate units or ethylene-2,7-naphthalate units in an amount of at least 80 mol % of the total of all the recurring units.

23. The polyalkylene naphthalate composition for a film according to claim 10, wherein the polyalkylene naphthalate contains diethylene glycol units in an amount of 0.4 to 3 wt %.

24. A process for producing the polyalkylene naphthalate for a film of claim 1 by subjecting an ester-forming derivative comprising naphthalenedicarboxylic acid as a main dicarboxylic acid component and a glycol comprising an aliphatic glycol as a main glycol component to an ester interchange reaction and then to a polycondensation reaction, wherein (a) an antimony compound and (b) a quaternary phosphonium sulfonate compound having an ester-forming functional group are added before the start of the polycondensation reaction.

25. A biaxially oriented film formed from the polyalkylene naphthalate of claim 1.

26. A biaxially oriented film formed from the polyalkylene naphthalate composition of claim 10.

27. A high-density magnetic recording medium comprising a biaxially oriented film formed from the polyalkylene naphthalate of claim 1 as a base film.

28. A high-density magnetic recording medium comprising a biaxially oriented film formed from the polyalkylene naphthalate composition of claim 10 as a base film.

* * * * *